United States Patent
Chen et al.

(10) Patent No.: US 6,826,667 B2
(45) Date of Patent: Nov. 30, 2004

(54) BUFFER ASSISTED DATA STORAGE METHOD AND SYSTEM WITH BUILT-IN FINGERPRINT RECOGNITION FUNCTION

(75) Inventors: Chun-Yu Chen, Taipei (TW); Nien-Tsu Chen, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 175 days.

(21) Appl. No.: 10/235,545

(22) Filed: Sep. 6, 2002

(65) Prior Publication Data

US 2004/0049644 A1 Mar. 11, 2004

(51) Int. Cl.$^7$ .............................................. G06F 12/00
(52) U.S. Cl. ...................... 711/163; 711/164; 711/4; 711/102; 711/103; 711/111; 711/115; 711/101; 382/115; 382/116; 382/124; 382/125; 345/539
(58) Field of Search ................................ 711/163, 164, 711/165; 382/115, 125, 209; 707/203–205; 235/380–382; 713/186.202

(56) References Cited

U.S. PATENT DOCUMENTS

| | | | | |
|---|---|---|---|---|
| 5,796,857 A | * | 8/1998 | Hara | 382/124 |
| 5,887,140 A | * | 3/1999 | Itsumi et al. | 709/225 |
| 6,002,783 A | * | 12/1999 | Obata et al. | 382/119 |
| 6,018,739 A | * | 1/2000 | McCoy et al. | 707/102 |
| 6,041,411 A | * | 3/2000 | Wyatt | 713/200 |
| 6,314,196 B1 | * | 11/2001 | Yamaguchi et al. | 382/125 |
| 6,337,918 B1 | * | 1/2002 | Holehan | 382/124 |
| 6,463,165 B1 | * | 10/2002 | Ito | 382/124 |

* cited by examiner

*Primary Examiner*—Zhuo H. Li
(74) *Attorney, Agent, or Firm*—Birch, Stewart, Kolasch & Birch, LLP

(57) ABSTRACT

A buffer assisted data storage method and system has built-in fingerprint recognition function. Recognized data is provided with a high hit-rate in a short time with the assistanace of a buffer, when a user processes his/her identity recognition through the built-in fingerprint recognition module of the data storage device. As a result, the entire identification and verification process is faster and more efficient. In addition, with the aim of enhancing flexibility of usage, an operation setup interface is introduced to optimize the overall performance of the buffer.

19 Claims, 3 Drawing Sheets

BUFFER ASSISTED DATA STORAGE METHOD AND SYSTEM WITH BUILT-IN FINGERPRINT RECOGNITION FUNCTION

BACKGROUND OF THE INVENTION

1. Field of Invention

The invention relates to a data access system and method. Specifically, it is a system and method applied to a plug and play (PnP) portable data storage device that employs fingerprint identification technology with a buffer, which assists in quickly retrieving data as contrasted with fingerprints of users to confirm user identities and allow access to the data storage device.

2. Related Art

With the coming of the 'm-commerce' era, new slim-and-light personal portable devices (such as mobile phones, PDAs, portable laptop computers and the like) with comprehensive functionality and great carry-and-go portability, have recently come onto the market. These newly launched devices have become more and more popular; the demand for, and development of such popular devices never remains stagnant. More diversification of such devices is to be explored and applied. Among which, portable data storage device has become one of the hottest topics in the development of personal portable devices. Because of the convenience and handiness it offers to users, the portable data storage device is now playing an indispensable role in the realm of 'm-commerce', or mobile commerce, and is becoming another emerging trend of the future.

In general, conventional portable data storage devices take advantage of the characteristics of Plug and Play (PnP) devices, to afford every facility to users and to enable users freely to connect the devices to other connecting terminals and access the information therein. Therefore, there is almost no security mechanism designed to place a security control on data access. Some conventional devices adopt encryption, encoding or compression methods (while saving data) to prevent an unauthorized data access in case of misplacement or loss, and some take the user's password (as with conventional software) approach. All the aforesaid security mechanisms inconvenience users. Therefore, to solve the aforementioned problems, fingerprint identification technology has been applied to portable data storage devices to assist in verifying identity. This process is simple and easy-to-use; it requires only a few verifying steps. It not only eliminates the old, tedious decryption work, but also resolves the confusion caused by the conventional password mechanisms.

Yet, when the verification process (of the portable data storage devices) becomes tedious and complicated by reason of repeated procedures (such as retrieving, recognizing, verifying and matching), the said process turns out to be ineffective. Therefore, combining the advanced technology of computer software and hardware with portable (fingerprint recognition) data storage devices to set up a comprehensive buffer matching mechanism, may greatly improve overall performance.

SUMMARY OF THE INVENTION

In light of the aforementioned circumstances, the invention aims at establishing a buffer matching mechanism to assist the recognition process of a portable PnP data storage device, and offering a system and method of fingerprint recognition and data storage in order to achieve a high recognition and access rate.

Another object of the invention is to offer a user-friendly operation interface configuration. This allows users to fine-tune the memory buffer's configuration and optimize its functionality, allowing the system and method of the invention to have more flexibility.

To achieve the above-mentioned goal, the invention of a data storage system with buffer memory and fingerprint recognition comprises: a data storage module, a transmission interface module, a fingerprint recognition module, and a control module.

In addition, the methods of the said invention include the following steps: linking the data storage device to the terminal, entering a receiving/inputting mode to accept a fingerprint image, processing an identification operation through a buffered contrast mechanism, transmitting the access control command to allow access transmission, processing selected corresponding data transmission through a transmission interface.

The detailed description of the content and technology of the invention is depicted in the following diagrams:

DETAILED DESCRIPTION OF THE INVENTION

The invention relates to a buffer assisted data system and method with a built-in fingerprint recognition function. By adding the buffer function to a data storage device 200, the recognition process is accelerated and has great accuracy. Furthermore, the data access rate of the PC terminal 100 also increases.

Figure 1:
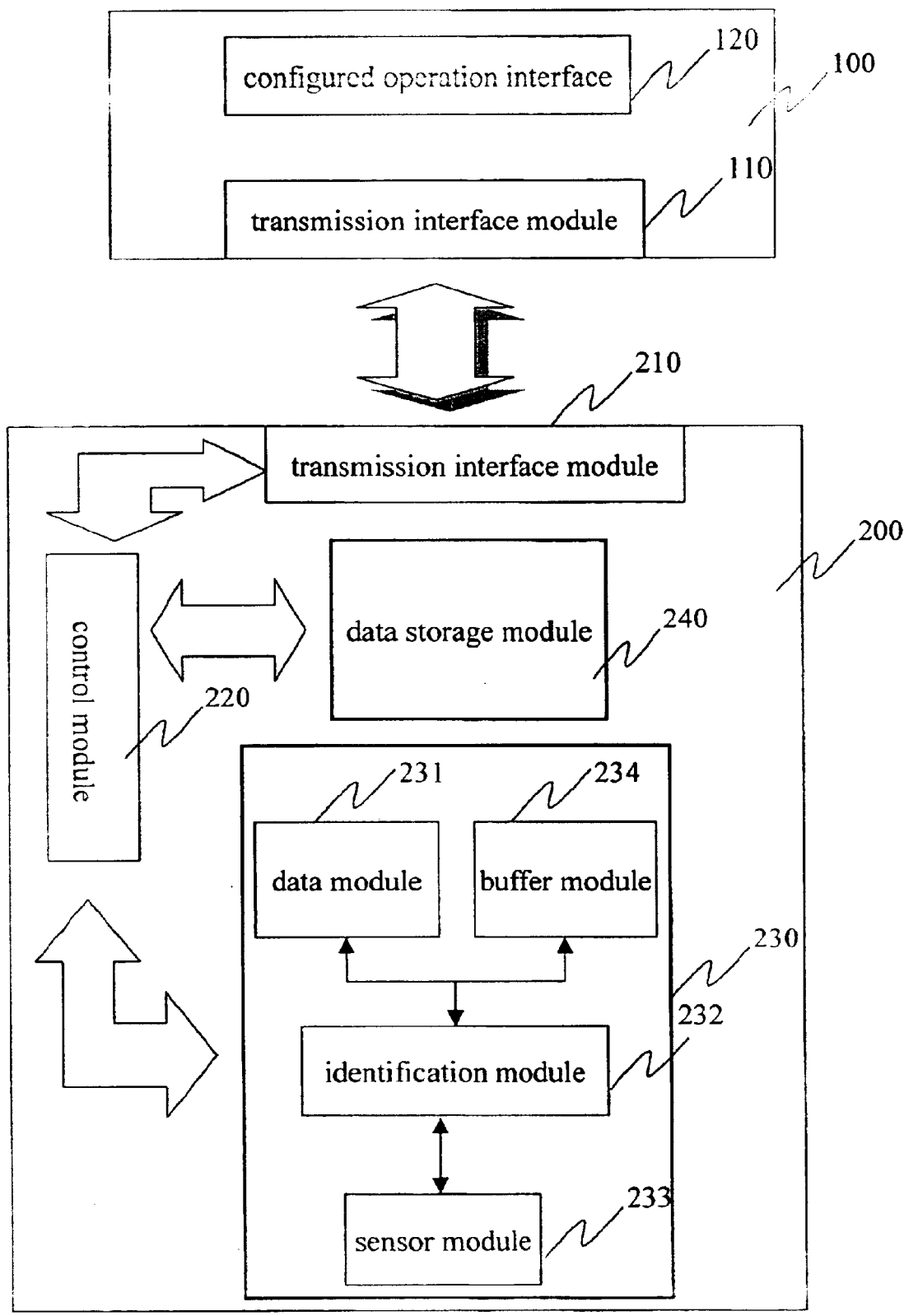
FIG. 1 is the systematic structure diagram of the invention.
Figure 2:
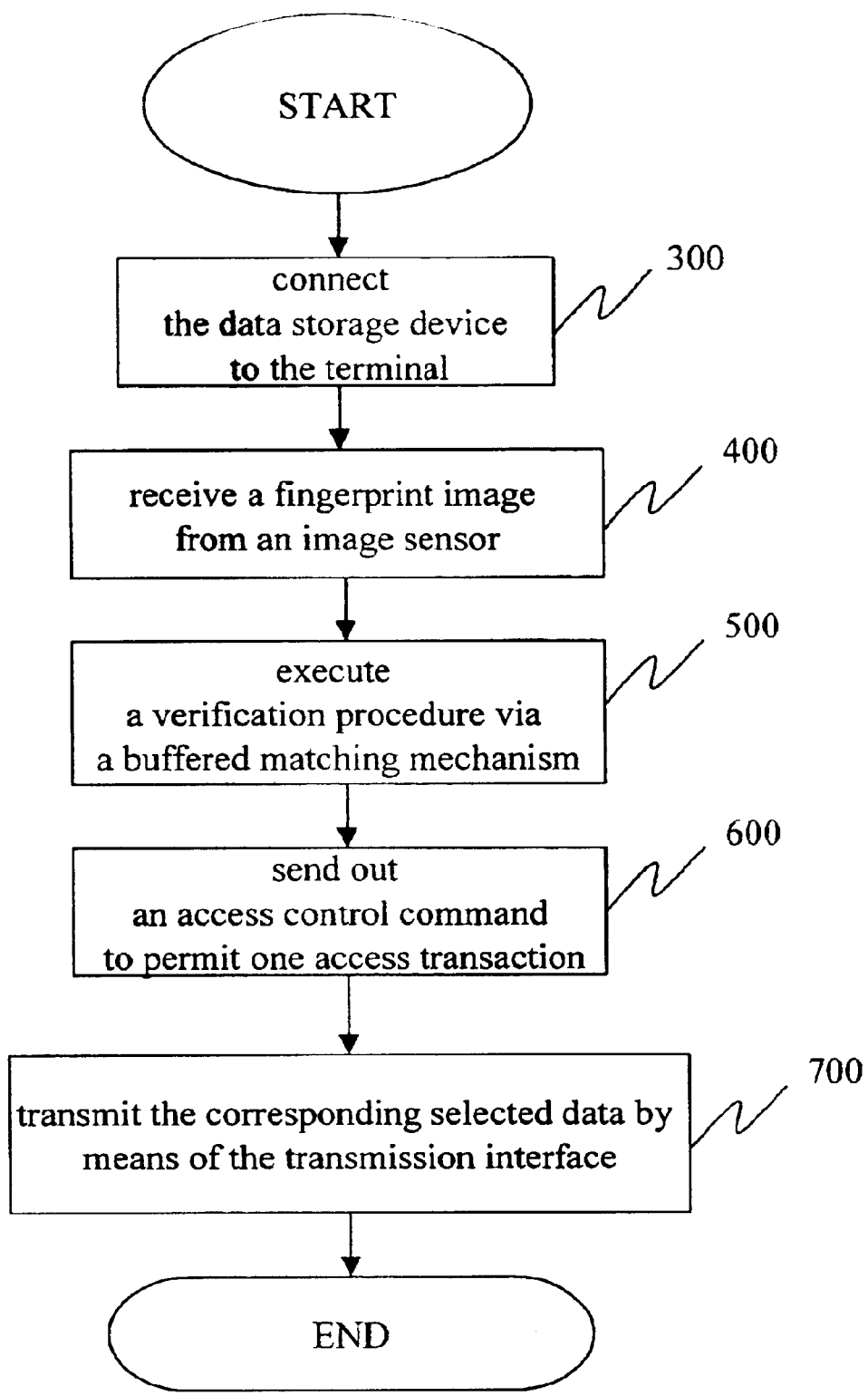
FIG. 2 is the principal procedural flowchart of the invention.

FIG. 2 below illustrates the principal procedural flowchart of the invention; FIG. 1 below illustrates the systematic structure of the invention. The detailed description of the invention is as follows:

Prior to accessing data in the data storage device 200, a user must connect the data storage device 200 to the PC terminal 100 (STEP 300). Once connected, the data storage device 200 automatically enters the transferring and receiving mode. In this transferring and receiving mode, the said device waits for the user to input his/her fingerprint followed by an identifying procedure (STEP 400). The sensor module 233 senses and receives the user's fingerprint in the fingerprint recognition module 230. Once the user's fingerprint image data is received, the identification module 232 in the fingerprint recognition module 230 executes matching via the built-in buffer matching mechanism (STEP 500). The buffer matching mechanism first utilizes the recognized data that is pre-stored in the buffer module 234. If nothing matches, the buffer matching mechanism automatically switches to the data module 231 and retrieves and processes the data therein. Once the identifying task is completed and verified, the fingerprint recognition module 230 generates an access control command, allowing the authorized user to access data, and at the same time, it passes the said command to the control module 220. When the control module 220 receives the aforesaid command, it enables the automated data transfer and access function. The user may then proceed to accessing the data in the data storage module 240 (STEP 600). At this time, the user may select the desired data or content from the data storage device 200 through the PC terminal 100. Furthermore, the corresponding data is transferred and accessed by connecting the transmission interface module 110 in the PC terminal 100 and the transmission interface module 210 in the data storage device 200 (STEP 700). The entire principal procedure is thus completed.

Figure 3:
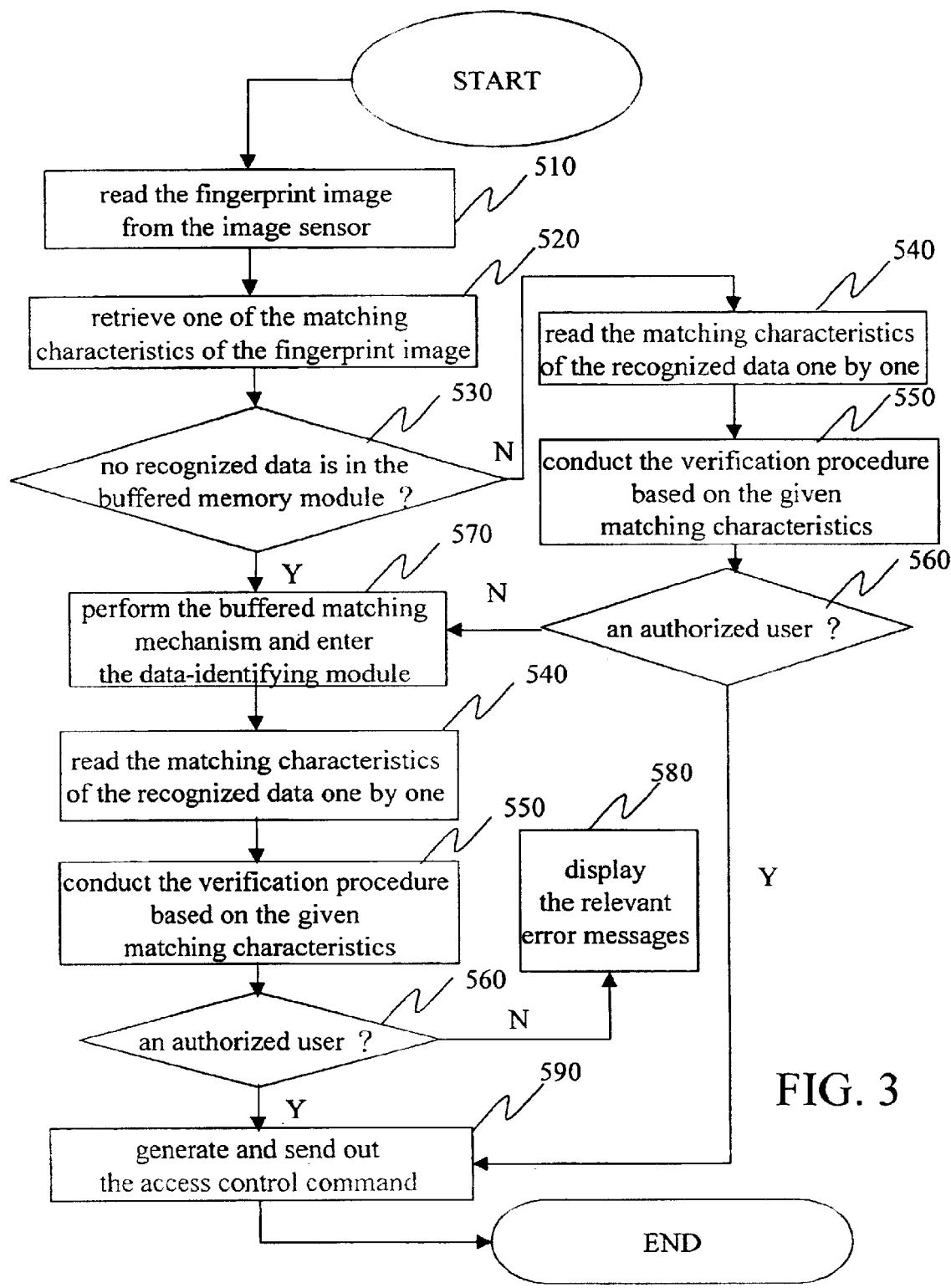
FIG. 3 is the buffer-aided flowchart of the invention.

FIG. 3 further illustrates the procedural flow of the buffer-aided invention:

First of all, the identification module 232 reads the user's inputted fingerprint image from the (image) sensor module 233 (STEP 510), and retrieves the matching characteristics of the fingerprint image from the image sensor via fingerprint identification technology (STEP 520). At this time, the buffer memory matching mechanism in the identification module 232 is activated and it automatically checks for any familiar data in the buffer module 234 (STEP 530). If matching data is found, the said mechanism starts to read and identify the recognized data in the buffer module 234. First, it retrieves the matching characteristics of the recognized data (STEP 540), followed by the identifying procedure based on the given matching characteristics (STEP 550), and further determines if the user is an authorized user (STEP 560). If yes, it generates an access control command and transfers the command to the control module 220 (STEP 590). Otherwise, it proceeds to the next record of recognized data until entire database has been read. If the buffer module 234 finds no suitable authorized user, the buffer matching mechanism automatically retrieves the recognized data in the data module 231 (STEP 570) instead. In the above-mentioned STEP 530, if the buffer matching mechanism in the identification module 232 confirms that no data is stored in the buffer module 234, the same procedure follows and it proceeds to STEP 570 as a result. At this point, the identification module 232 starts to read and process the data. First, it retrieves the matching characteristics of the recognized data (STEP 540), followed by the identifying procedure based on the given matching characteristics (STEP 550), and it further determines whether the user is an authorized user (STEP 560). If none of the data matches, it indicates that the user is not an authorized user of this particular data storage device 200. If so, the user sees a relevant error message (STEP 580). If the user is confirmed as an authorized user, the access control command is generated and transferred to the control module 220 (STEP 590). The operation is then complete.

The invention further provides an executable computer program stored in the data storage module 240. This program may be selected and executed from the PC terminal 100. This offers users the configured operation interface 120 to freely configure the setup and the relevant buffer rules in the buffer module 234. These rules or protocols include a limited number of records stored in buffer, and the rule for filtering and saving the memory buffer. The buffer-aided function provides the best performance and comfort for the user.

ACHIEVEMENTS OF THE INVENTION

The invention is a system and method of buffer-aided fingerprint recognition and data storage. It uses the information stored in a PnP data storage device, and by means of fingerprint identification technology, which is aided by a memory buffer, a user's identity can be verified. It significantly reduces the time needed to search mass information directly. Furthermore, the hit rate for identifying data increases tremendously and the matching accuracy is greatly improved.

The invention provides a configured operation interface (of a computer program) that allows users to configure the rules for the buffer through an external PC terminal when executing the program. The said interface not only optimizes the functionality of buffer-aided memory, but also adds flexibility to the invention.

While the invention has been described with reference to a preferred embodiment and alterations thereto, it is to be understood by those skilled in the art that various changes in form and detail may be made therein without departing from the spirit and scope of the invention.

What is claimed is:

1. A data storage system with a buffer which utilizes fingerprint identification technology, while a data storage device connects to an external PC terminal, for recognizing a user identity, the system comprises:

a data storage module, which stores a specific user's data content;

a transmission interface module, which carries out data transfer of the data storage module and also sends out operating signals;

a fingerprint identification module, which receives a fingerprint image for carrying out the identification operation, generates an access control command to proceed access to stored data, further comprises:

a sensor module, which receives a fingerprint image and transfers the fingerprint image for identification;

a buffer module, which stores the recognize data of the authorized user based on the setup protocol of the buffer;

a data module, which stores all recognized data of the authorized user; and an identification module, which retrieves the characteristic of the fingerprint image as contrasted with stored recognized data for proceeding the identification operation; and a control module, which proceeds a self-test procedure for the data storage device, controls transfer of data access message and enables the control of access function for data transfer, according to a generated access control command, wherein the buffer module has a buffered matching mechanism, to the recognizing data retrieved from the buffer module undergoing an identity-match process, when no information matches, the matching mechanism switches back to data module and starts all over again.

2. The invention as recited in claim 1, wherein the system's data storage device and an external PC terminal are connected to transfer information and data within.

3. The invention as recited in claim 2, wherein the system connects to the external terminal via a wired and a wireless linkage.

4. The invention as recited in claim 1, wherein the buffer module is a flash memory.

5. The invention as recited in claim 1, wherein the system further comprises an executable computer program located in the data storage module, and said program is executable from the linked terminal and provides a configured operation interface, wherein the buffer module is configurable the memory buffer setup.

6. The invention as recited in claim 1, wherein the protocol of the buffer contains a set of rules for stored-number and a set of rules for storage.

7. A data storage method with buffer utilizes fingerprint identification technology, while a data storage device connects to an external PC terminal, for recognizing a user identity, the method comprises the following steps:

connecting the data storage device to the terminal;

entering the receiving/inputting mode to accept a fingerprint image from fingerprint sensor;

executing the identifying process by way of buffered matching mechanism;

sending an access control command and allowing an access transfer; and transferring the corresponding access item through a transmission interface, wherein the buffer module has a buffered matching mechanism, to the recognizing data retrieved from buffer module undergoing an identity-match process, when no information matches, the matching mechanism switches back to data module and starts all over again.

8. The invention as recited in claim 7, wherein the system's data storage device and an external PC terminal are connected to transfer information and data within.

9. The invention as recited in claim 8, wherein the system connects to the external terminal via a wired and a wireless linkage.

10. The invention as recited in claim 7, wherein the method further comprises an executable computer program located in the data storage module, and the program is executable from the linked terminal and provides a configured operation interface, wherein the buffer module is configurable the memory buffer setup.

11. The invention as recited in claim 10, wherein the protocol of the buffer contains a set of rules for storednumber and a set of rules for storage.

12. The invention as recited in claim 7, wherein the steps of receiving a fingerprint image for executing an identification operation by buffer matching mechanism further comprises the following steps:

reading the fingerprint image;

retrieving a contrasted characteristic of the fingerprint image;

reading the contrasted characteristic of the recognized data in buffer module one by one;

executing the identification operation of respective contrasted characteristic; and generating and issuing the access control command.

13. The invention as recited in claim 7, wherein the steps of receiving a fingerprint image for executing an identification operation by buffer matching mechanism further comprises the following steps:

reading the fingerprint image;

retrieving a contrasted characteristic of the fingerprint image;

reading the contrasted characteristic of the recognized data in buffer module one by one;

executing the identification operation of respective contrasted characteristic;

starting over again to read the contrasted characteristic of the recognized data in data module one by one;

executing the identification operation of respective contrasted characteristic; and generating and issuing the access control command.

14. The invention as recited in claim 7, wherein the buffer module is a flash memory.

15. A data storage method with buffer utilizes fingerprint identification technology, while a data storage device connects to an external PC terminal, for recognizing a user identity, the method comprises the following steps:

connecting the data storage device to the terminal;

entering the receiving/inputting mode to accept a fingerprint image from fingerprint sensor;

executing the identifying process by way of buffered matching mechanism;

sending an access control command and allowing an access transfer; and transferring the corresponding access item through a transmission interface, wherein the steps of receiving a fingerprint image for executing an identification operation by buffer matching mechanism further comprises the following steps:

reading the fingerprint image;

retrieving a contrasted characteristic of the fingerprint image;

reading the contrasted characteristic of the recognized data in buffer module one by one;

executing the identification operation of respective contrasted characteristic;

starting over again to read the contrasted characteristic of the recognized data in data module one by one;

executing the identification operation of respective contrasted characteristic; and generating and issuing the access control command.

16. The invention as recited in claim 15, wherein the system's data storage device and an external PC terminal are connected to transfer information and data within.

17. The invention as recited in claim 15, wherein the method further comprises an executable computer program located in the data storage module, and the program is executable from the linked terminal and provides a configured operation interface, wherein the buffer module is configurable the memory buffer setup.

18. The invention as recited in claim 17, wherein the protocol of the buffer contains a set of rules for storednumber and a set of rules for storage.

19. The invention as recited in claim 15, wherein the buffer module is a flash memory.

* * * * *